US012799800B2

(12) United States Patent
Meisler

(10) Patent No.: US 12,799,800 B2
(45) Date of Patent: Nov. 17, 2026

(54) SAFE WITH AUXILIARY SAFE

(71) Applicant: Irving Meisler, Birmingham, AL (US)

(72) Inventor: Irving Meisler, Birmingham, AL (US)

( * ) Notice: Subject to any disclaimer, the term of this patent is extended or adjusted under 35 U.S.C. 154(b) by 165 days.

(21) Appl. No.: 18/608,021

(22) Filed: Mar. 18, 2024

(65) Prior Publication Data

US 2025/0290371 A1 Sep. 18, 2025

(51) Int. Cl.
*E05G 1/08* (2006.01)

(52) U.S. Cl.
CPC .................................... *E05G 1/08* (2013.01)

(58) Field of Classification Search
CPC .............. E05G 1/026; E05G 1/06; E05G 1/08
See application file for complete search history.

(56) References Cited

U.S. PATENT DOCUMENTS 1,551,902 A * 9/1925 Nelson .................... E05G 1/026 109/57
3,822,925 A * 7/1974 Osroff ....................... E06B 7/34 312/321.5
5,163,745 A * 11/1992 Zagata ................... A47B 96/00 312/223.5
7,748,606 B2 * 7/2010 Mikolajczyk ....... E05B 17/2088 70/416
10,472,879 B1 * 11/2019 Galler ...................... E05B 53/00
10,480,241 B1 * 11/2019 Jude ........................... E05G 1/08
11,972,650 B2 * 4/2024 Rambadt ................... E05G 1/10
2012/0280605 A1 * 11/2012 Nettles ....................... E06B 7/34 312/321.5
2015/0159426 A1 * 6/2015 Kallay ....................... E06B 7/28 49/70

* cited by examiner

*Primary Examiner* — Christopher J Boswell
(74) *Attorney, Agent, or Firm* — Baker, Donelson, Bearman, Caldwell & Berkowitz, PC

(57) ABSTRACT

A double safe has a primary housing and a primary door pivotally coupled to the primary housing through primary hinges to define a primary safe with a primary interior space. The primary door has a primary lock. The double safe includes a secondary safe that may be mounted to the primary door. The secondary safe includes a secondary housing and a secondary door with a secondary lock. The secondary housing defines an auxiliary or second interior space. Optionally, the secondary safe may be mounted to the primary housing.

2 Claims, 3 Drawing Sheets

SAFE WITH AUXILIARY SAFE

CROSS REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

TECHNICAL FIELD

The present disclosure relates to safes, and more particularly, the disclosure relates to a safe with additional features.

BACKGROUND OF THE INVENTION

Safes have been used for decades to allow for the storage of items, such as valuables or guns while preventing the unauthorized access to the items therein. Many safes use a metal enclosure having a lock. The lock may be in the form of a combination lock, key lock, or a more modern biometric lock which is access through a person's fingerprint or the like.

Large safes typically have a very heavy box-like structure or body with a pivoting front door with a locking mechanism. The front door is opened to provide access to the interior space of the body for the storage and removal of items to be contained in a secure environment. The sheer weight of the safe provides a higher level of security due to the distinct hinderance to moving or stealing the entire safe to gain access to the contents therein.

However, a problem with these large safes is that the complexity of the locking mechanism and weight of the door may be burdensome. These drawbacks may cause a reluctance to utilize the safe with items that are constantly being used, i.e., stowed and withdrawn frequently. This may also cause a reluctance to utilize the safe for an item that must be accessed quickly in an emergency situation, such as a gun during a break-in of a house.

Accordingly, it is seen that a need remains for a safe which is large and heavy to hinder its removal yet allows for ease of access to select items that are frequently being stowed or removed from the safe, or for immediate access in case of an emergency. It is to the provision of such therefore that the present invention is primarily directed.

SUMMARY OF THE INVENTION

A double safe comprises an exterior, primary housing defining a primary interior space configured to receive articles to be stored, a primary door pivotally coupled to the primary housing, and a primary lock coupled to the primary door for locking and unlocking the primary door. Wherein the combination of the primary housing, the primary door, and the primary lock forms a primary safe, an interior, secondary housing positioned within the primary housing and configured to receive articles to be stored. The secondary housing defines a secondary interior space separate and apart from the primary interior space. The double safe also includes a secondary door pivotally coupled to the primary door, and a secondary lock coupled to the secondary door for locking and unlocking the secondary door. Wherein the combination of the secondary housing, the secondary door, and the secondary lock forms a secondary safe coupled to the primary safe.

A double safe comprises an exterior, primary housing defining a primary interior space configured to receive articles to be stored, the primary housing having at least a primary front wall, a primary rear wall opposite the primary front wall, and two oppositely disposed sidewalls extending between the primary front wall and the primary rear wall, a primary door pivotally coupled to the primary housing, and a primary lock coupled to the primary door for locking and unlocking the primary door. Wherein the combination of the primary housing, the primary door, and the primary lock forms a primary safe. The double safe also has an interior, secondary housing positioned within the primary housing and configured to receive articles to be stored, the secondary housing defining a secondary interior space separate and apart from the primary interior space, a secondary door pivotally coupled to the secondary housing, and a secondary lock coupled to the secondary door for locking and unlocking the secondary door. Wherein the combination of the secondary housing, the secondary door, and the secondary lock forms a secondary safe coupled to the primary safe.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Figure 2:
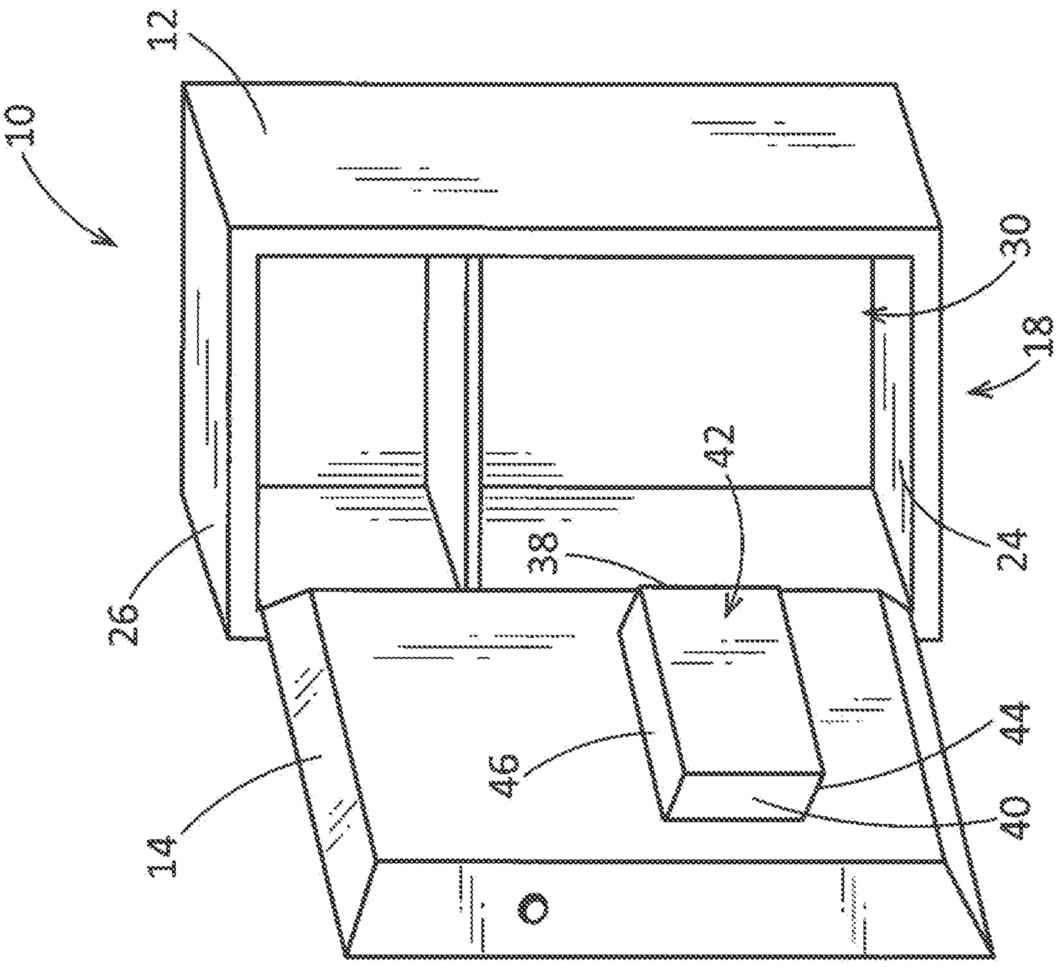
FIG. 2 is a perspective view of the double safe of FIG. 1, shown in a door open configuration.
Figure 1:
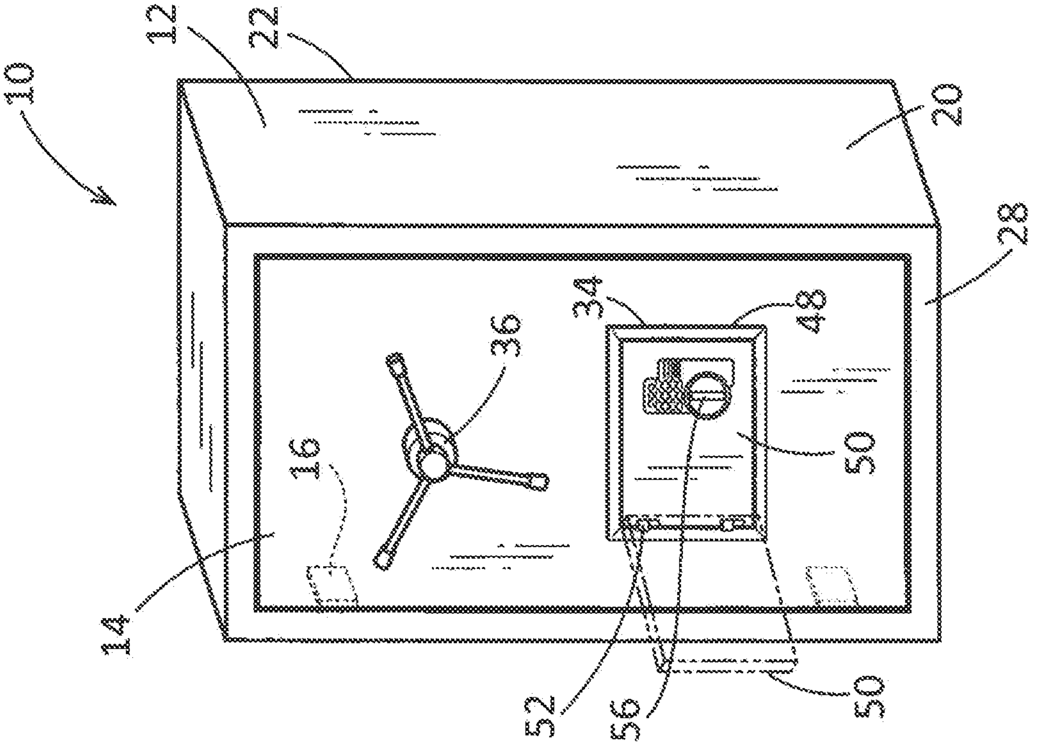
FIG. 1 is a perspective view of a double safe embodying principles of the invention in a preferred form, shown in a door closed configuration.

With reference next to FIGS. 1 and 2 of the drawings, there is a shown a safe with auxiliary safe or double safe 10 in a preferred form of the present invention. The double safe 10 includes an exterior, first, or primary housing, body, locker, or cabinet 12 and a primary or first door 14 pivotally coupled to the primary housing 12 through primary hinges 16. The primary housing 12 and primary door 14 define a primary safe 18.

The primary housing 12 includes a pair of primary sidewalls 20, a primary rear wall 22, a primary floor 24, a primary top wall 26, and a primary front wall or frame 28. The primary housing 12 is made of a heavy gauge metal so that the weight of the double safe 10 aids in preventing the double safe 10 from being easily moved or stolen. The primary housing 12 defines a primary or first interior space 30 for holding valuables or items to remain safe from unwanted access. As such, the safe primary interior space 30 may include shelves, drawers, or other accessories to aid in the storage of items.

The primary door 14 is shown to be generally rectangular in shape. The primary door 14 includes a small secondary or auxiliary safe 34 positioned centrally on the primary door 14, however, it should be understood that the positioning of the secondary safe 34 upon the primary door 14 is irrelevant. The primary door 14 has an externally accessible primary lock 36 that secures the position of the primary door 14 to the primary housing 12 in its closed or locked position, and which allows for the opening and movement of the primary door 14 to its unlocked or open position. The primary lock 14 may be any type of conventionally known locking mechanism such as a mechanical lock or a biometric lock that requires a fingerprint, retina scan, hand scan or any other biometric measurement to acuate.

The secondary safe 34 includes an auxiliary or secondary housing 38 having a pair of secondary sidewalls 40, a secondary rear wall 42, a secondary floor 44, a secondary top wall 46, and a secondary front wall or frame 48. The front wall or frame 48 may be incorporated into or be part of the primary front wall 28 of the primary housing 12. A secondary door 50 is pivotally mounted to the secondary front wall or frame 48 through secondary hinges 52 for pivotal movement between an open position, shown in phantom lines in FIG. 1, and a closed position, shown in FIG. 1. The secondary housing 38 is made of a heavy gauge metal. The secondary housing 39 defines an auxiliary or second interior space 54 for holding small valuables or items to remain safe from unwanted access such as a gun. As such, the safe secondary interior space 54 may include shelves, drawers, or other accessories to aid in the storage of items.

The secondary door 50 is shown to be generally rectangular in shape but may be of any shape. The secondary door 50 has an externally accessible secondary lock 56 that secures the position of the secondary door 50 to the secondary housing 38 or primary door 14 in its closed position and which allows for the opening of the secondary door 50 and movement of the secondary door 50 to its unlocked or open position. The secondary lock 56 may be any type of conventionally known locking mechanism such as a mechanical lock or a biometric lock that requires a fingerprint, retina scan, hand scan or any other biometric measurement to acuate. The secondary lock 56 may be of a different type than the primary lock 36 so that it is more easily or quickly accessed and operated in case of an emergency situation. The term “externally accessible” in reference to the primary and secondary locks 36 and 56 means that the locks are exposed and readily accessible to a user and does not mean that a lock is hidden or secured behind another or different locked door or other structure that prevents direct access to the lock.

In use, the primary interior space 30 of the primary safe 18 may be accessed through the unlocking of the primary lock 36 so that the primary door 14 may be pivoted from its closed position to its open position. Once opened, articles to be stowed within the primary interior space 30 for safe keeping. The primary door 14 may then be pivoted through primary hinges 16 to its closed position and the primary lock 36 may be activated, either manually or automatically, to lock the primary door 14 in its closed position.

Similarly, the secondary interior space 54 of the secondary safe 34 may be accessed through the unlocking of the secondary lock 56 so that the secondary door 50 may be pivoted from its closed position to its open position. Once opened, articles to be stowed within the secondary interior space 54 for safe keeping. The secondary door 50 may then be pivoted through secondary hinges 52 to its closed position and the secondary lock 56 may be activated, either manually or automatically, to lock the secondary door 50 in its closed position.

Thus, the primary interior space 30 may be utilized for articles that are not accessed frequently or for articles that require a high level of protection afforded by the more robust construction of the primary housing 12, primary door 14 and primary lock 36. The secondary interior space 54 of the secondary safe 34 may be utilized for articles that are more frequently accessed or for articles that require a fast access in case of emergency. It should be understood that the secondary door 50 may be opened regardless of the position (open or closed) of the primary door 14.

Figure 3:
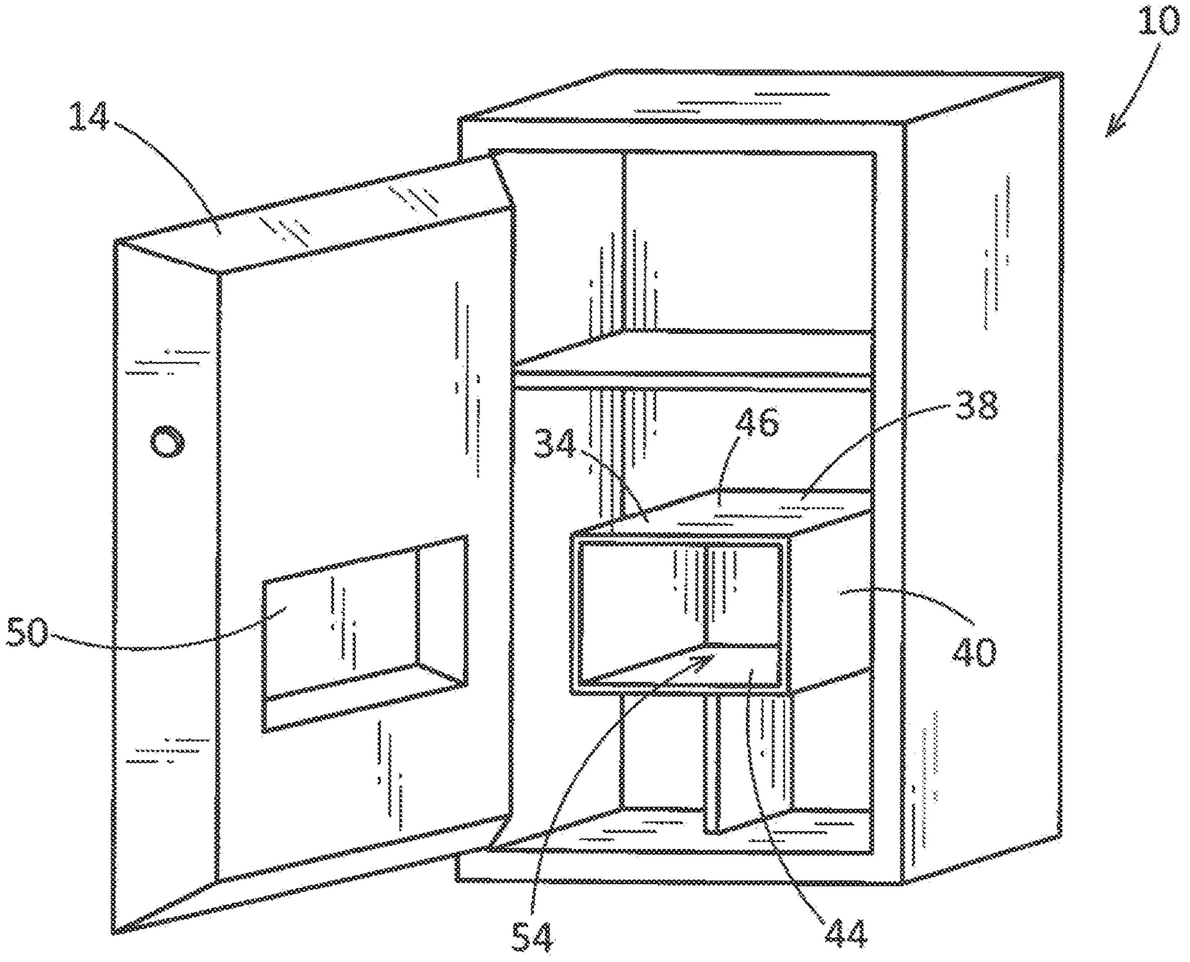
FIG. 3 is a perspective view of a double safe embodying principles of the invention in another preferred form, shown in a door open configuration.

It should be understood that the secondary housing 38 may or may not be coupled to the primary door 14. As shown in FIGS. 1 and 2, if the secondary housing 38 is coupled to the primary door 14, the opening of the primary door 14 will not allow access to the secondary interior space 54 of the secondary safe, as the secondary interior space 54 remains closed by the secondary door 50 and attached secondary housing 38. In this case, the secondary housing 38 is coupled to the interior surface of the primary door 14 so that the secondary housing 38 moves along with the primary door 14 during the opening or closing process. However, as shown in FIG. 3, if the secondary housing 38 is not coupled to the primary door 14, but instead coupled to the primary housing 12, the opening of the primary door 14 may allow access to the secondary interior space 54 of the secondary safe 34, as the secondary interior space 54 is now open by the displacement of the primary door 14 and secondary door 50. In this case, the secondary housing 38 must be directly coupled to the primary housing 12 to support the secondary housing 38.

Figure 5:
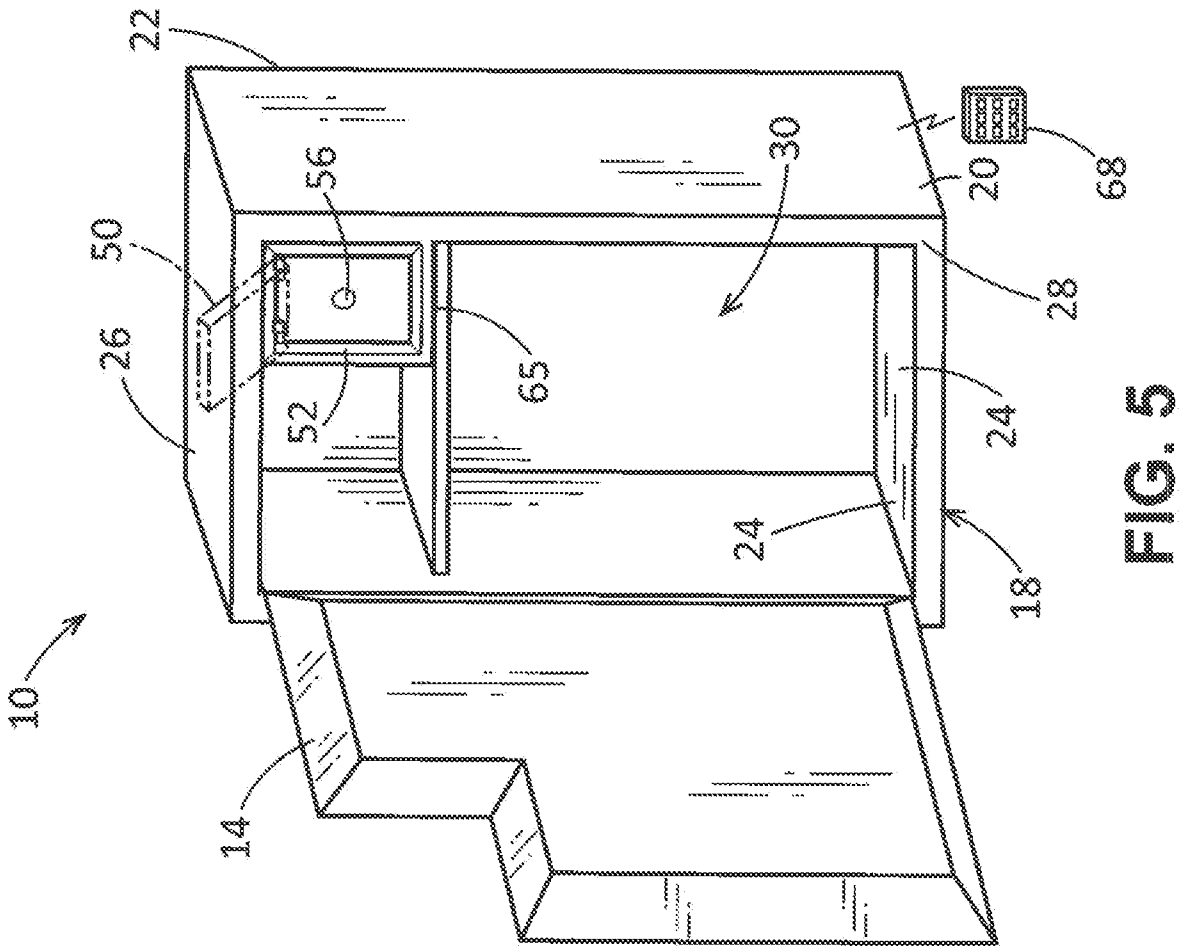
FIG. 5 is a perspective view of the double safe of FIG. 4, shown in a door open configuration.
Figure 4:
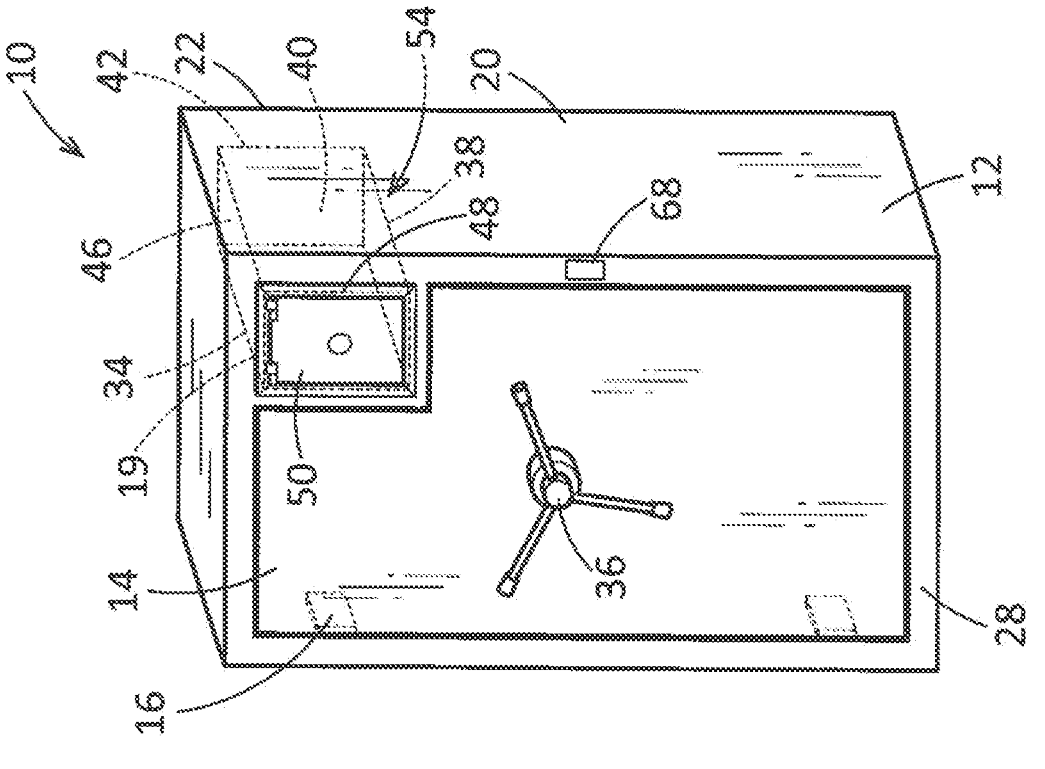
FIG. 4 is a perspective view of a double safe embodying principles of the invention in another preferred form, shown in a door closed configuration.

With reference next to FIGS. 4 and 5, there is shown a safe with auxiliary safe or double safe 10 in another preferred form of the present invention. The double safe 10 includes an exterior, first, or primary housing, body, locker, or cabinet 12 and a primary or first door 14 pivotally coupled to the housing 12 through primary hinges 16.

The primary housing 12 includes a pair of primary sidewalls 20, a primary rear wall 22, a primary floor 24, a primary top wall 26, and a primary front wall or frame 28. These walls may be incorporated into or with the primary walls. The primary housing 12 is made of a heavy gauge metal so that the weight of the double safe 10 aids in preventing the double safe 10 from being easily moved or stolen. The primary housing 12 defines a primary or first interior space 30 for holding valuables or items to remain safe from unwanted access. As such, the safe primary interior space 30 may include shelves, drawers, or other accessories to aid in the storage of items.

The primary door 14 is shown to be generally rectangular in shape with a cut-out portion 65 in the upper right hand corner. A small secondary or auxiliary safe 34 is positioned within the cut-out portion 65 of the primary door 14 and mounted to the primary housing 12, however, it should be understood that the cut-out portion 65 may be positioned almost anywhere within the primary door 14. The primary door 14 has an externally accessible primary lock 36 that secures the position of the primary door 14 to the primary housing 12 in its closed or locked position, and which allows for the opening and movement of the primary door 14 to its unlocked or open position. The primary lock 14 may be any type of conventionally known locking mechanism such as a mechanical lock or a biometric lock that requires a fingerprint, retina scan, hand scan or any other biometric measurement to acuate.

The secondary safe 34 includes an interior, auxiliary, or secondary housing 38 having a pair of secondary sidewalls 40, a secondary rear wall 42, a secondary floor 44, a secondary top wall 46, and a secondary front wall or frame 48. Optionally, one of the secondary sidewalls 40 may be included in the sidewall 20 of the primary housing 12. A secondary door 50 is pivotally mounted to the secondary front wall or frame 48 through secondary hinges 52 for pivotal movement between an open position and a closed position. The secondary housing 38 is made of a heavy gauge metal. The secondary housing 39 defines an auxiliary or second interior space 54 for holding small valuables or items to remain safe from unwanted access such as a gun. As such, the safe secondary interior space 54 may include shelves, drawers, or other accessories to aid in the storage of items. The secondary interior space 54 may extend the entire depth of the primary housing 12 to allow for long items to be placed within the secondary interior, such as a rifle, shotgun, or the like.

The secondary door 50 is shown to be generally rectangular in shape but may be of any shape. The secondary door 50 has an externally accessible secondary lock 56 that secures the position of the secondary door 50 to the secondary housing 38 or primary housing 12 in its closed position and which allows for the opening of the secondary door 50 and movement of the secondary door 50 to its unlocked or open position. The secondary lock 56 may be any type of conventionally known locking mechanism such as a mechanical lock or a biometric lock that requires a fingerprint, retina scan, hand scan or any other biometric measurement to acuate. The secondary lock 56 may be of a different type than the primary lock 36 so that it is more easily or quickly accessed and operated in case of an emergency situation wherein fast access to the contents of the safe is required.

In use, the primary interior space 30 of the primary safe 10 may be accessed through the unlocking of the primary lock 36 so that the primary door 14 may be pivoted from its closed position to its open position. Once opened, articles to be stowed within the primary interior space 30 for safe keeping. The primary door 14 may then be pivoted through primary hinges 16 to its closed position and the primary lock 36 may be activated, either manually or automatically, to lock the primary door 14 in its closed position.

Similarly, the secondary interior space 54 of the secondary safe 34 may be accessed through the unlocking of the secondary lock 56 so that the secondary door 50 may be pivoted from its closed position to its open position. Once opened, articles to be stowed within the secondary interior space 54 for safe keeping. The secondary door 50 may then be pivoted through secondary hinges 52 to its closed position and the secondary lock 56 may be activated, either manually or automatically, to lock the secondary door 50 in its closed position.

Thus, the primary interior space 30 may be utilized for articles that are not accessed frequently or for articles that require a high level of protection afforded by the more robust construction of the primary housing 12, primary door 14 and primary lock 36. The secondary interior space 54 of the secondary safe 34 may be utilized for articles that are more frequently accessed or for articles that require a fast access in case of emergency. It should be understood that the secondary door 50 may be opened regardless of the position (open or closed) of the primary door 14. The shear weight of the double safe 10 aids in protecting the items stowed within even the secondary interior space 54 due to the hinderance in moving or stealing the entire safe.

It should be understood that the keypad 68 of the biometric lock or other locking mechanism may be mounted anywhere upon the double safe 10 and need not be mounted solely upon the secondary door 50. This locking mechanism may even include a remote pad 68 mounted remotely from the entire double safe 10 so as to allow remote access to through a wireless connection. This enables a person outside the vicinity of the safe to allow access to a person in the vicinity of the safe, such as to allow remote access to a gun to someone that may not have the code or authorization to open the secondary door 50.

It should be understood that the primary interior space 30 is generally separate and apart from the secondary interior space 54.

It should be understood that as used herein the terms main, primary, first and the like may be used interchangeably. Similarly, the terms auxiliary, secondary, ancillary or the like may be used interchangeably.

It should be understood that the combination of the primary door 14 and the secondary door 50 at least partially define a front surface of the double safe 10, as the front surface is the exterior surface facing the user of the safe during the opening and closing of the primary or secondary doors 14 and 50.

It should be understood that the secondary door 50 may be opened or pivoted in any direction. For instance, the secondary door 50 may pivot upwardly to allow easier access to long items within the secondary safe 34, as shown in phantom lines in FIG. 5.

Variations of the safe fall within the spirit of the claims, below. It will be appreciated that the inventions are susceptible to modification, variation, and change without departing from the spirit thereof.

The invention claimed is:

1. A double safe comprising:

an exterior, primary housing defining a primary interior space configured to receive articles to be stored;

a primary door pivotally coupled to said primary housing;

a primary lock coupled to said primary door for locking and unlocking said primary door;

wherein the combination of said primary housing, said primary door, and said primary lock forms a primary safe;

an interior, secondary housing positionable within said primary housing and configured to receive articles to be stored, said secondary housing being mounted to said primary door and not mounted to said primary housing for relative movement of said secondary housing with movement of said primary door, said secondary housing defining a secondary interior space separate and apart from said primary interior space;

a secondary door pivotally coupled to said primary door;

a secondary lock coupled to said secondary door for locking and unlocking said secondary door, and wherein the combination of said secondary housing, said secondary door, and said secondary lock forms a secondary safe coupled to said primary safe, said secondary safe capable of remaining closed regardless of the pivotal position of said primary door.

2. A double safe comprising:

a cabinet having a front surface, a rear surface opposite said front surface, two oppositely disposed side surfaces extending between said front surface and said rear surface, a top wall extending between said front surface and said rear surface, and a floor extending between said front surface and said rear surface;

the front surface at least partially including a primary door and a secondary door coupled to said primary door, said primary door being pivotal between an open position and a closed position, said secondary door being pivotal between an open position and a closed position;

an externally accessible primary locking mechanism for locking said primary door in its closed position;

an externally accessible secondary locking mechanism for locking said secondary door in its closed position, and an auxiliary housing distinct from said cabinet and mounted directly to said primary door and separate from said cabinet so said auxiliary housing moves with said primary door as said primary door moves between the open position and the closed position so that an interior space of said auxiliary housing may remain inaccessible regardless of the position of said primary door if the secondary door is in its closed position.

* * * * *